United States Patent

Chang

[11] Patent Number: 5,511,943
[45] Date of Patent: Apr. 30, 1996

[54] SINGLE-THROW SWITCH CIRCUIT CONTROLLING A CEILING FAN AND LIGHT ASSEMBLY

[76] Inventor: Chin-Hsiung Chang, No. 192, Shu Jen Rd., Ban Tan Chun, Wu Fong Hsiang, Taichung Hsien, Taiwan

[21] Appl. No.: 338,201

[22] Filed: Nov. 9, 1994

[51] Int. Cl.⁶ .................................. F04D 27/00
[52] U.S. Cl. .................. 416/5; 416/61; 417/63; 417/326; 315/362; 307/156
[58] Field of Search .......................... 416/5, 61, 170 R; 417/63, 326; 362/96; 315/194, 291, 362; 307/41, 156; 318/257; 340/310.01

[56] References Cited

U.S. PATENT DOCUMENTS

| | | | |
|---|---|---|---|
| 4,322,632 | 3/1982 | Hart et al. | 307/41 |
| 4,413,211 | 11/1983 | Fowler | 318/257 |
| 4,621,992 | 11/1986 | Angott | 416/5 |
| 4,716,409 | 12/1987 | Hart et al. | 340/825.22 |
| 4,719,446 | 1/1988 | Hart | 340/310.01 |
| 4,990,908 | 2/1991 | Tung | 340/825.63 |
| 5,189,412 | 2/1993 | Mehta et al. | 340/825.22 |

FOREIGN PATENT DOCUMENTS 6-10881  1/1994  Japan .......................... 416/5

*Primary Examiner*—Edward K. Look
*Assistant Examiner*—James A. Larson
*Attorney, Agent, or Firm*—Varndell Legal Group

[57] ABSTRACT

A method and device using a single-throw switch for controlling the revolving speed of the ceiling fan and light assembly and the light intensity of its lamps. The method obtains a 60 Hz square wave of cycle 16.67 ms from a typical alternating current power supplied from an electric power company and provides a working direct current voltage to a microprocessor through a direct current power supply circuit. When power is turned off and on (a switching cycle) by the single-throw switch, the microprocessor calculates the interrupting time during each switching cycle and regulates the revolving speed of the ceiling fan or the light intensity of the lamps based on the calculated result.

4 Claims, 3 Drawing Sheets

SINGLE-THROW SWITCH CIRCUIT CONTROLLING A CEILING FAN AND LIGHT ASSEMBLY

BACKGROUND AND SUMMARY OF THE INVENTION

The present invention relates to a method of using a single-throw switch circuit for controlling the revolving speed of a ceiling fan and the light intensity of the lamps on the ceiling fan according to the switching time (the time interval between turning the single-throw switch off and then back on again). The present invention also relates to a single-throw switch circuit for use in the aforesaid method, which comprises a microprocessor that regulates the revolving speed of the ceiling fan when the switching time surpasses one second, or regulates the light intensity of the lamps on the ceiling fan when the switching time is shorter than one second.

The operation of a conventional ceiling fan and light assembly is controlled by a pull chain switch or switches. The user must come to the ceiling fan and light assembly to pull the appropriate chain switch, in order to regulate fan speed or light intensity. This is inconvenient. Furthermore, the use of the pull chain switch destroys the sense of beauty of the ceiling fan and light assembly.

There is known another control method that eliminates the aforesaid problem. This control method uses two separate switches to control the operation of the ceiling fan and the operation of the lamps respectively. The switch for controlling the operation of the ceiling fan is a rotary switch, which is commonly installed in the wall and tamed to regulate the revolving speed of the ceiling fan by changing the impedance of a capacitor, which provides power to the fan motor of the ceiling fan. The major drawback of this method is it requires a complicated installation procedure for the switches.

There is known still another control method for controlling the operation of a ceiling fan and light assembly by means of a remote-controller. It is convenient and functional to use a remote-controller to control the operation of a ceiling fan and light assembly. However, the cost of a remote-controller for this purpose is high.

There is known still another control method for controlling the operation of a ceiling fan and light assembly by means of a multi-step single-throw switch. However, this structure of such a multi-step single-throw switch is a mechanical switching device that does not eliminate the drawback of controlling the revolving speed of the ceiling and the light intensity of the lamps in proper order.

The present invention has been accomplished in view of the above circumstances. It is one object of the present invention to provide a single-throw switch for controlling the operation of a ceiling fan and light assembly that permits the user to regulate the revolving speed of the ceiling fan or the light intensity of the lamps independently. It is another object of the present invention to provide a method of using a single-throw switch to control the operation of a ceiling fan and light assembly that allows the revolving speed of the ceiling fan and the light intensity of the lamps to be independently controlled. It is a further object of the present invention to provide a single-throw switch for controlling the operation of a ceiling fan and light assembly, which comprises a microprocessor that regulates the revolving speed of the ceiling fan when the interrupting time during each switching cycle of the single-step single throw switch surpasses one second, or that regulates the light intensity of the lamps fan when the interrupting time is shorter than one second.

DETAILED DESCRIPTION OF THE PREFERRED EMBODIMENT

Figure 1:
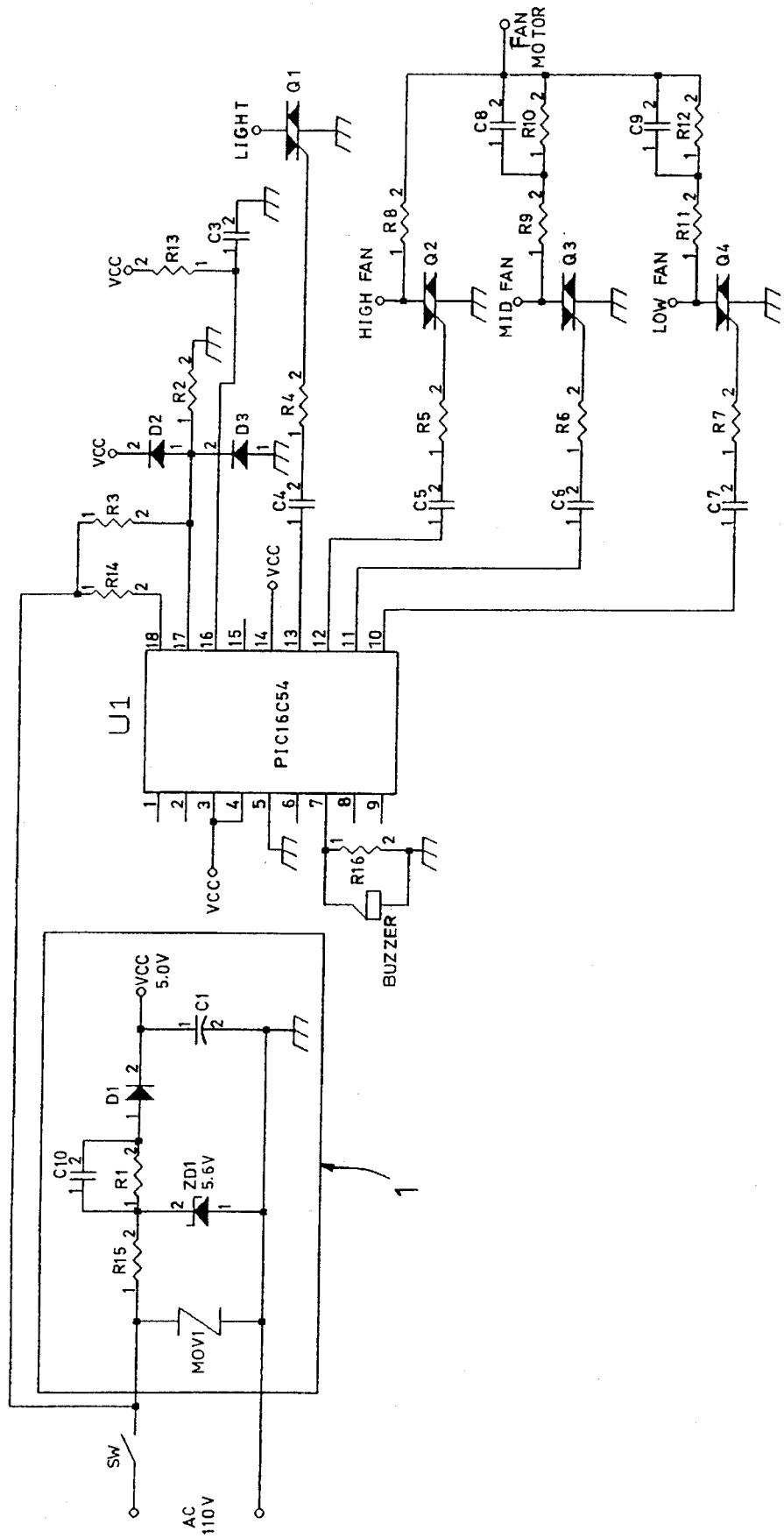
FIG. 1 is a circuit diagram according to the present invention.
Figure 2:
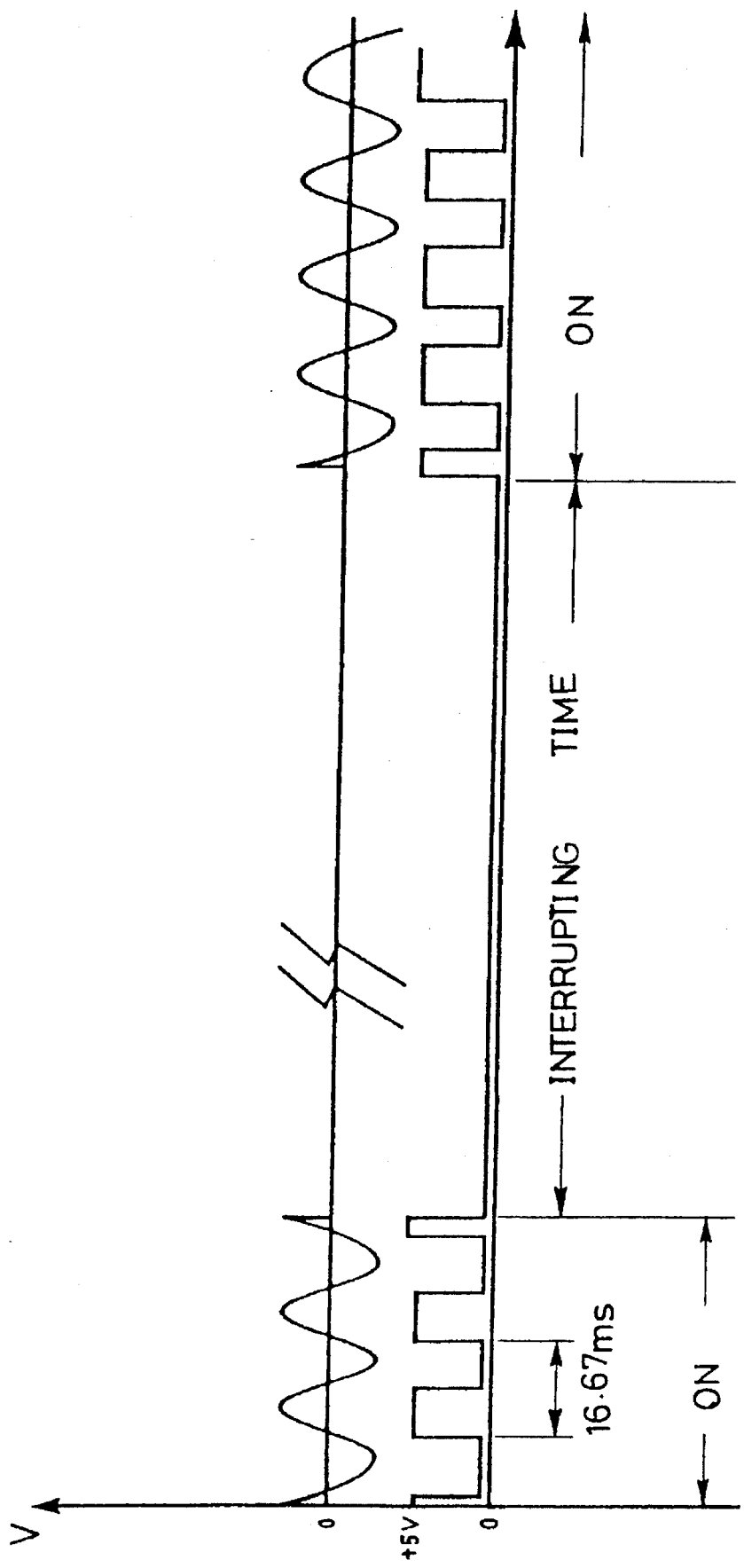
FIG. 2 is a time sequence chart according to the present invention.
Figure 3:
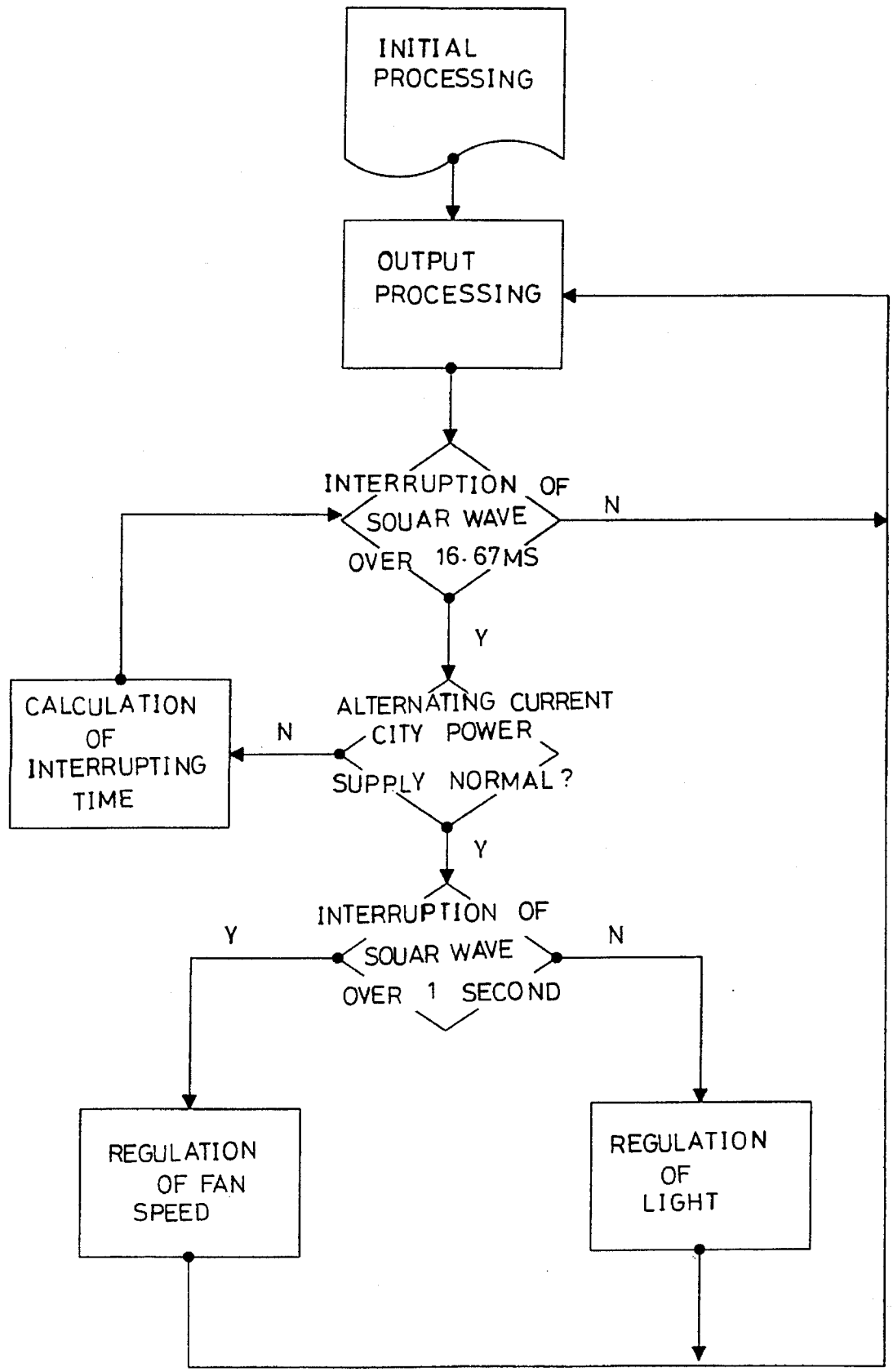
FIG. 3 is an operation flow chart of the internal program of a microprocessor according to the present invention.

FIG. 1 shows a circuit diagram of a single-throw switch circuit according to the present invention, which uses a 8-bit single chip microprocessor PIC16C54 U1 as the control center for regulating the intensity of light of the lamps of a ceiling fan and light assembly. Alternating current 110 V power from a typical electric power company is connected in series to a single-throw switch SW, then connected to a DC power supply circuit 1 that provides a direct current 5 V power supply, and to a resistor R14, which is connected to RA1 pin 18 of the microprocessor U1 to detect the phase of alternating current city power supply. The microprocessor U1 includes a standard clock. Alternating current power is further connected to two shunt resistors R3 and R2. The middle point between the shunt resistors R3 and R2 is connected to RA0 pin 17 of the microprocessor U1, and also connected in series with two diodes D2 and D3. Therefore, the middle point between the shunt resistors R3 and R2 provides a low voltage square wave of cycle 16.67 ms (a frequency equal to alternating current city power supply; see FIG. 2). The gate of the TRIAC Q1, which regulates the intensity of light, and the gates of the TRIACs Q2, Q3 and Q4, which regulate the revolving speed of the fan motor by three steps, are respectively connected the microprocessor U1's RB7 pin 13, RB6 pin 12, RB5 pin 11 and RB4 pin 10. RB1 pin 7 of the microprocessor U1 is connected to a buzzer. When the single-throw switch SW is ON, the single-throw switch circuit is staged, causing the fan motor and the Lamps to operate according to a preset status. At the same time, RA0 pin 17 of the microprocessor U1 provides 60 Hz square waves. When the single-throw switch SW is switched OFF, alternating current city power supply is cut off and the square wave disappears. During this stage of operation, the discharge capacitor C1 of the direct current power supply circuit 1 still provides power to the microprocessor U1, permitting it to continuously work for about 5 to 10 seconds. Within this short period after the interruption of alternating current power before the switch SW is mined on again, the microprocessor U1 calculates the length of time in which the square wave disappears or, in other words, is not present. This is the time from when the single-throw switch is mined OFF to the time the single-throw switch is mined back ON. This length of time calculated by the microprocessor U1 is the switching or interrupting time. Because the switch SW is a manual switch, the switching time surpasses 16.67 ms. If the switching or interrupting time is greater than one second, the microprocessor U1 regulates the revolving speed of the fan motor according to its built-in program automatically. This is achieved by the microprocessor U1 triggering a different TRIAC Q2, Q3, or Q4, namely, triggering one of the three TRIACS each time so as to regulate the respective resistance and capacitance and thereby changing the revolving speed of the fan motor. Whenever the revolving speed of the fan motor is changed, the microprocessor U1 triggers the buzzer to make a sound. If the switching or interrupting time is less than one second, the microprocessor U1 regulates the light intensity of the lamps according to its built-in program automatically. This is achieved by the microprocessor U1 changing the angle of the gate of the TRIAC Q1. Therefore, the user can selectively regulate the removing speed of the ceiling fan or the light intensity of the lamps subject based on the switching speed, simply by the length of time between turning off the switch and then turning on the switch. If the single-throw switch is switched off and on at a fast speed (less than one second), the microprocessor U1 is driven to regulate the light intensity of the lamps. If the single-throw switch is switched on and off more slowly (greater than one second), the microprocessor is driven to regulate the revolving speed of the fan motor. The operation flow of the built-in program of the microprocessor U1 is outlined in FIG. 3.

What is claimed is:

1. A method of using a single-throw switch circuit for controlling a ceiling fan and light assembly, which comprises controlling a revolving speed and a light intensity of said ceiling fan and light assembly by switching said single-throw switch through switching cycles from an on position to an off position, calculating a switching time equal to a time for completing one said switching cycle, changing said revolving speed if said switching time is greater than a predetermined length of time, and changing said light intensity if said switching time is less than said predetermined length of time.

2. The method of claim 1, wherein a sound is produced when said revolving speed changed.

3. A ceiling fan and light assembly control circuit comprising a single-throw switch, a direct current power supply circuit, shunt resistors, a microprocessor and a fan speed control circuit and light intensity control circuit of a ceiling fan and light assembly for controlling revolving speed and light intensity; said direct current power supply circuit receiving alternating current power through said single-throw switch, converting said alternating current into low voltage direct current power and supplying said low voltage direct current power to said microprocessor when said single-throw switch is on and off; said shunt resisters arranged between said single-throw switch and said microprocessor and providing a square wave signal of a frequency equal to said alternating current power; said microprocessor receiving said square wave signal and having an output terminal connected to said fan speed control circuit and light intensity control circuit of a ceiling fan and light assembly, and a clock; said microprocessor monitoring said square wave signal and, when said square wave signal is interrupted by turning said single-throw switch off and on, calculating switching time equal to a time period of interruption of said square wave signal, changing said revolving speed if said switching time is greater than a predetermined period of time, and changing said light intensity if said switching time is less than said predetermined length of time.

4. The ceiling fan and light assembly control circuit of claim 3, further comprising a buzzer controlled by said microprocessor to produce a sound when said microprocessor changes said revolving speed.

\* \* \* \* \*